United States Patent [19]
Kitajima et al.

[11] Patent Number: 4,542,458
[45] Date of Patent: Sep. 17, 1985

[54] METHOD OF AND APPARATUS FOR ASSIGNING SOFTWARE RESOURCES TO MEMORY DEVICES

[75] Inventors: Hiroyuki Kitajima; Kazuhiko Ohmachi, both of Yokohama; Mitsuru Doki, Tokyo; Junichi Kazama, Yokohama; Hidekazu Kanao, Tokyo, all of Japan

[73] Assignee: Hitachi, Ltd., Tokyo, Japan

[21] Appl. No.: 495,594

[22] Filed: May 18, 1983

[30] Foreign Application Priority Data

May 21, 1982 [JP] Japan .................................. 57-84797

[51] Int. Cl.$^4$ .............................................. G06F 1/00
[52] U.S. Cl. .................................................. 364/200
[58] Field of Search ......... 364/200, 300, 900 MS File

[56] References Cited
U.S. PATENT DOCUMENTS
4,318,182  3/1982  Bachman et al. .................. 364/200

Primary Examiner—Raulfe B. Zache
Attorney, Agent, or Firm—Antonelli, Terry & Wands

[57] ABSTRACT

A method of assinging software resources such as files and programs to memory devices is disclosed which uses first storage for storing therein the access frequency to a memory device for causing each type of service request to utilize each of software resources and second storage for storing therein the processing speed, allowable utilization and storage capacity of each of memory devices and in which the allocation of each of said software resources to the memory devices is determined on the basis of information stored in the first and second storages so that a total time taken to access the memory devices is minimized while being restricted by the allowable utilization and storage capacity of each memory device.

12 Claims, 8 Drawing Figures

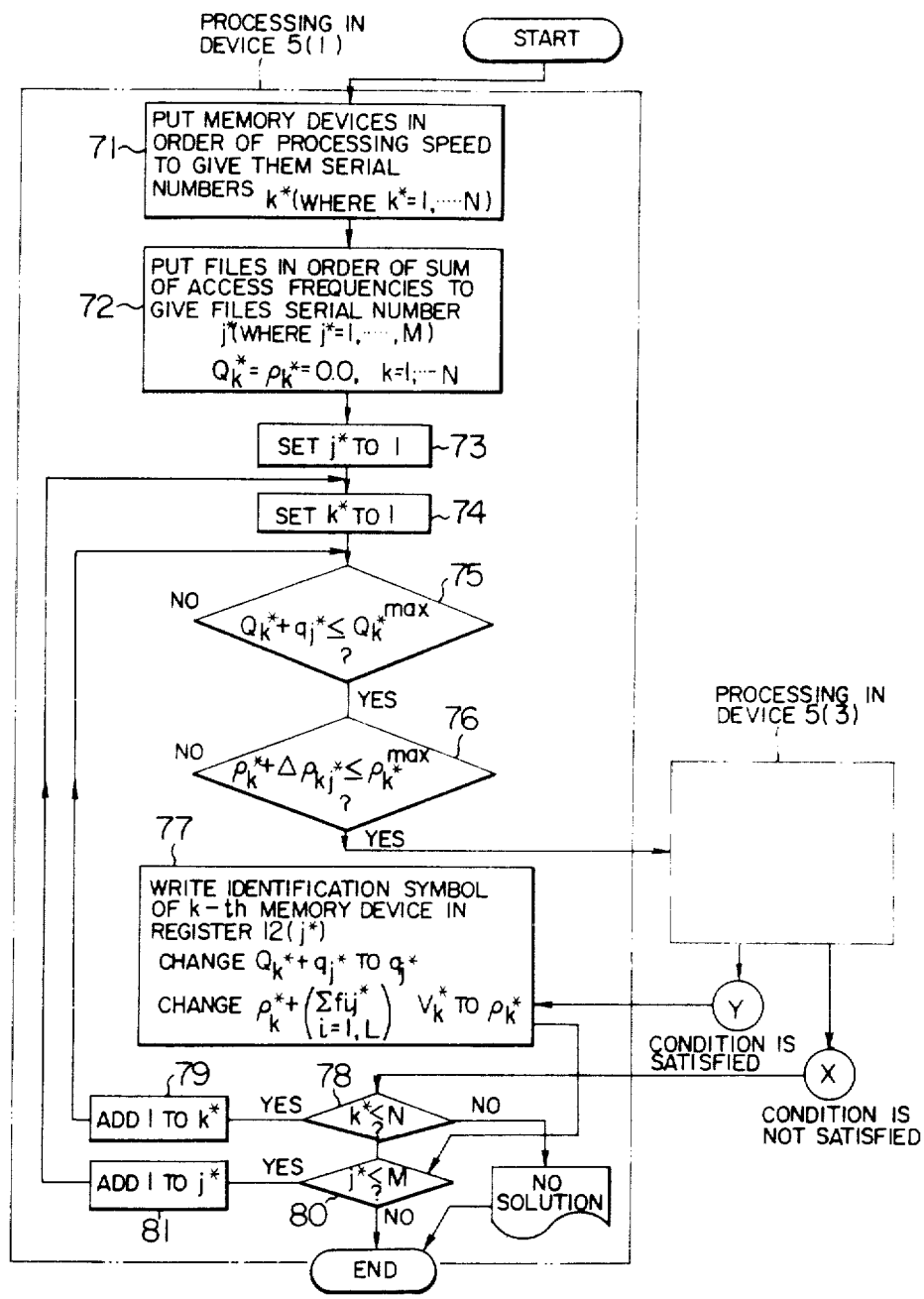

METHOD OF AND APPARATUS FOR ASSIGNING SOFTWARE RESOURCES TO MEMORY DEVICES

The present invention relates to a method of assigning software resources such as files and programs (hereinafter simply referred to as "files") to a plurality of memory devices included in a computer system.

Files are necessary for executing processing in a computer system, and generally stored in memory devices. A large number of files are used in a single computer system, and the performance and availability of the computer system are affected greatly by how each of the files is assigned to memory devices. For example, when files of very frequent use are assigned to the same memory device, loads are concentrated in the memory device, and thus there is a danger of a bottleneck in terms of performance being formed. Further, when files indispensable for a service are assigned to the same memory device, there arises a problem that a fault occurring in the memory device causes great damage.

The assignment of files to memory devices has hitherto been determined by an operator or designer on the basis of the statistical information or prediction with respect to the frequency of use of each file. However, such factors as performance, avaiability and cost have to be taken into consideration in assigning the files to the memory devices, and therefore it is impossible to obtain an appropriate assignment plan on the basis of only the judgment of mankind. Further, the file assigning operation has to be performed each time a new life is introduced in the computer system or a load pattern is changed, and therefore the operator or designer is obliged to have a large number of working processes.

It is accordingly an object of the present invention to provide a method of assigning files to memory devices which solves the drawbacks of the prior art, which improves the performance and availability of a computer system, and which reduces the number of working processes for determining the assignment of files to memory devices.

In order to attain the above object, according to the present invention, there is provided a method of assigning files to memory devices, in which the allocation of each of files to memory devices is determined by calculation periodically or each time the utilization of a file exceeds a threshold, on the basis of the access frequency to a memory device for causing a service request of a type to utilize a file, and the assignment of the files to the memory devices is carried out on the basis of the results of calculation.

The present invention will be made more apparent from the following detailed description taken in conjunction with the accompanying drawings, in which.

Figure 6A:
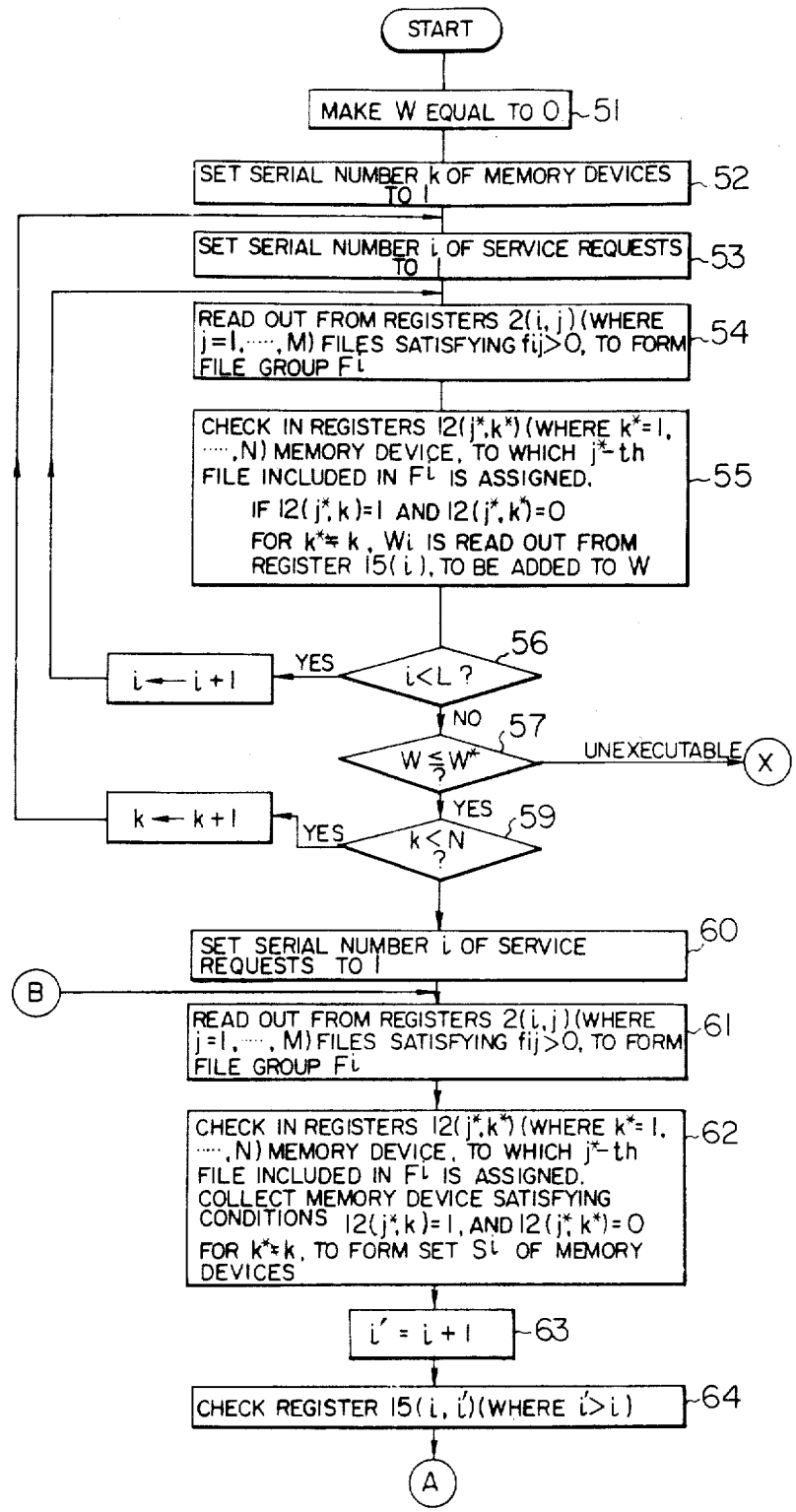
Figure 6B:
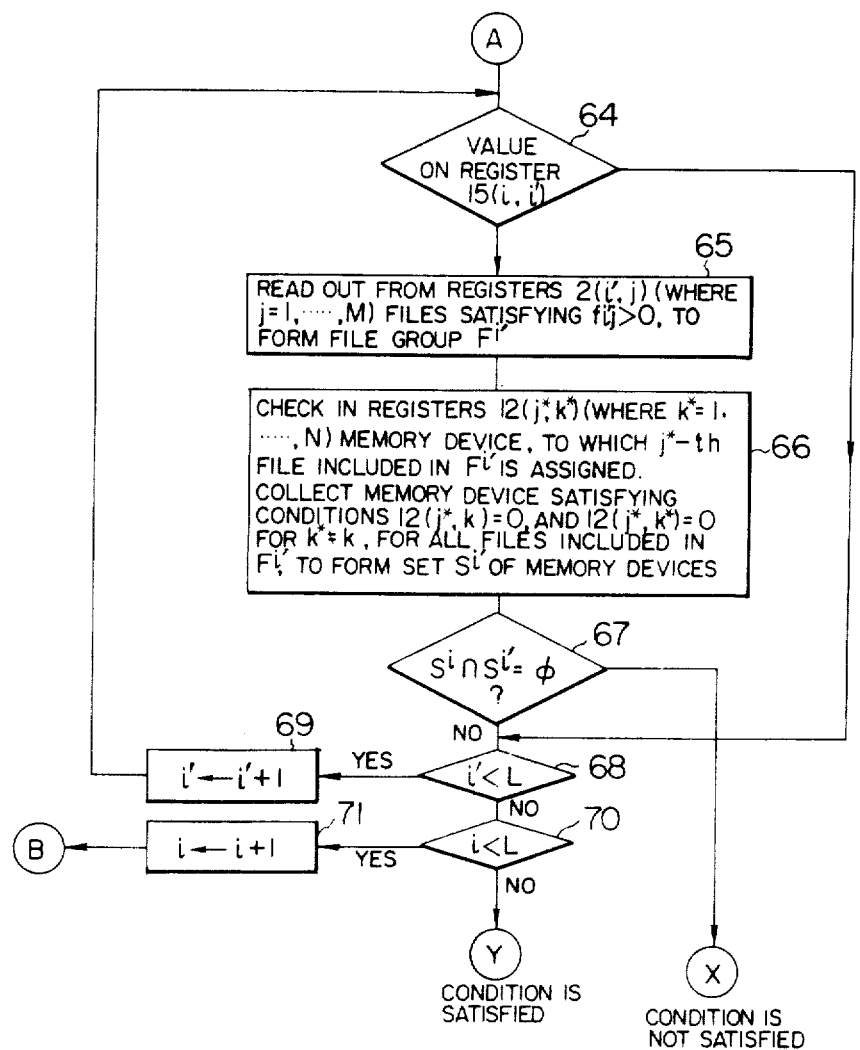

FIG. 6a and 6b are a flow chart showing the processing for judging whether the degree of damage caused by a fault in part of memory devices is less than a specified level or not; and FIG. 7 is a flow chart showing the processing for determining file allocation which can minimize a total time taken to utilize memory devices, under such restrictions as the storage capacity and allowable utilization of each memory device and the degree of damage caused by a fault in part of memory devices.

Now, the present invention will be explained below in detail, on the basis of embodiments thereof.

Figure 1:
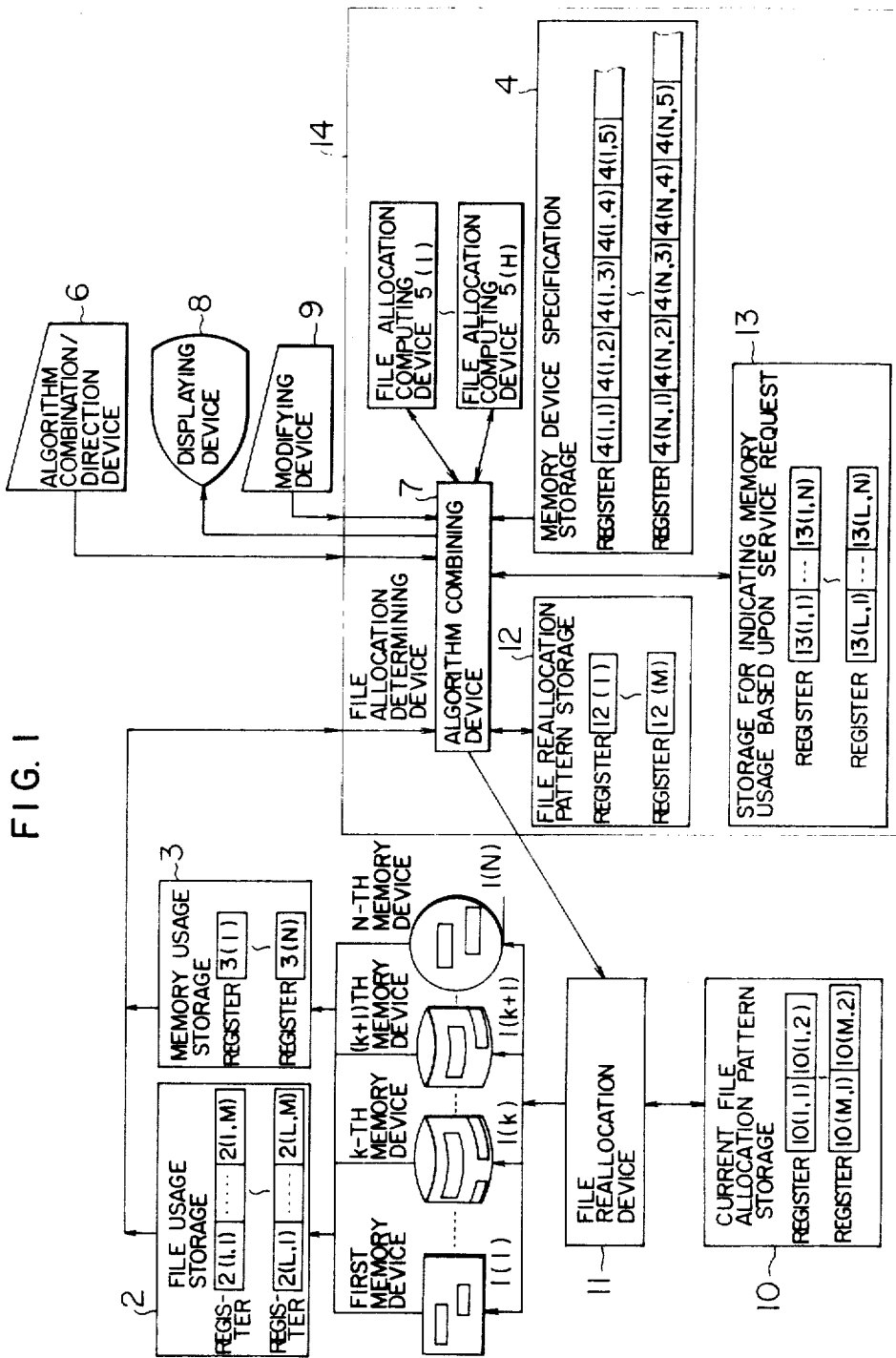
FIG. 1 is a block diagram showing the general structure of an embodiment of a system which is used for realizing a file assigning method according to the present invention.

FIG. 1 shows, in block, the structure of an embodiment of a system which is used for realizing a file assigning method according to the present invention. Referring to FIG. 1, reference symbols 1(1) to 1(N) designate first, second, . . . and N-th memory devices, each of which may be an IC memory, a magnetic disc, a magnetic tape, a magnetic bubble device and others. Each of files is stored in any one of the memory devices. Reference numeral 2 designates a file usage storage, which stores therein statistical information with respect to the utilization of each file at a predetermined period $\Delta\tau$. In the storage 2, reference numberals 1 to L correspond to identification numbers of service request types processed by the computer system, and 1 to M identification numbers of files used in the computer system. Each type of service request is a processing unit on the side of a user, and is usually formed of a job, transaction on command. Further, reference symbol $2(i,j)$ (where $i=1, \ldots, L$, and $j=1, \ldots, M$) designates a register for storing therein the access frequency the memory devices (1) to 1(N) which is necessary in the case where the service request of the i-th type utilizes the j-th file at the period $\Delta\tau$. In the case where a time taken to access a memory device in a reference operation has to be discriminated from that in an update operation, the access frequency for reference and the access frequency for update are stored separately. Reference numeral 3 designates a memory usage storage, which stores therein a really used time of each memory device at the period $\Delta\tau$. In the storage 3, reference symbol $3(k)$ (where $k=1, \ldots, N$) designates a register corresponding to the k-th memory device. Reference numeral 4 designates a memory device specification storage, which stores therein information with respect to the specification of the memory devices 1(1) to 1(N). In the storage 4, reference symbols 4(k, 1), 4(k, 2), 4(k, 3), 4(k, 4) and 4(k, 5) designate registers for storing therein the processing speed (namely, a time required for one access), allowable utilization, storage capacity, cost, failure rate of the memory device $1(k)$, respectively, where $k=1, \ldots, N$. Reference symbols 5(1) to 5(H) designate file allocation computing devices. For example, reference symbol 5(1) indicates a device for computing optimum file allocation from the viewpoint of performance, and 5(2) a device for judging by calculation whether a file allocation pattern can attain a desired availability level which is previously specified, or not. Incidentally, only these two file allocation computing devices are used in the present embodiment. Reference numeral 6 designates on algorithm combination/direction device, which specifies one or a combination of the file allocation computing devices 5(1) to 5(H) and the desired availability for the service request of the i-th type (where $i=1, \ldots, L$). In the case where it is desired to determine file allocation on the basis of a predicted workload, information corresponding to the contents of the registers included in the file usage storage 2 is inputted to the algorithm combination/direction device 6. Reference numeral 7 designates an algorithm combining device, which selects from the file allocation computing devices 5(1) to 5(H) one or more devices which are specified by the algorithm combination/direction device 6. When a plurality of file allocation computing devices are specified, the device 7 combines these file allocation computing devices to cause each of them to perform a desired operation. Reference numeral 8 designates a displaying device, 9 a modifying device, and 10 a current file allocation pattern storage. In the storage 10, reference symbol 10(j, 1) (where $j=1, \ldots, M$) designates a register for storing therein the storage capacity of the j-th file, and 10 (j, 2) (where $j=1, \ldots, M$) a register for storing therein an identification symbol of a memory device, to which the j-th file is now allocated, that is, a register for showing a current file allocation pattern. Reference numeral 11 designates a file reallocation device, which compares an optimum file allocation pattern determined by the devices 7 and 9 with a current file allocation pattern in the storage 10 to change file allocation so that the latter pattern agrees with the former pattern. Reference numeral 12 designates a file reallocation pattern storage. In storage 12, reference symbol 12(j) (where $j=1, \ldots, M$) designates a register for storing therein an identification symbol of a memory device to which the j-th file is reallocated. Reference numeral 13 designates a storage for indicating memory usage based upon a service request. In the storage 13, reference symbol 13 (i, k) (where $i=1, \ldots, L$, and $k=1, \ldots, N$) designates a register for storing therein an identification symbol of the k-th memory device used by the service request of the i-th type. Reference numeral 14 designates a file allocation determining device, which includes the storages 4, 12 and 13 and the devices 5(1) to 5(H) and 7.

Next, explanation will be made on the operation of the present embodiment having the above-mentioned structure.

Figure 2:
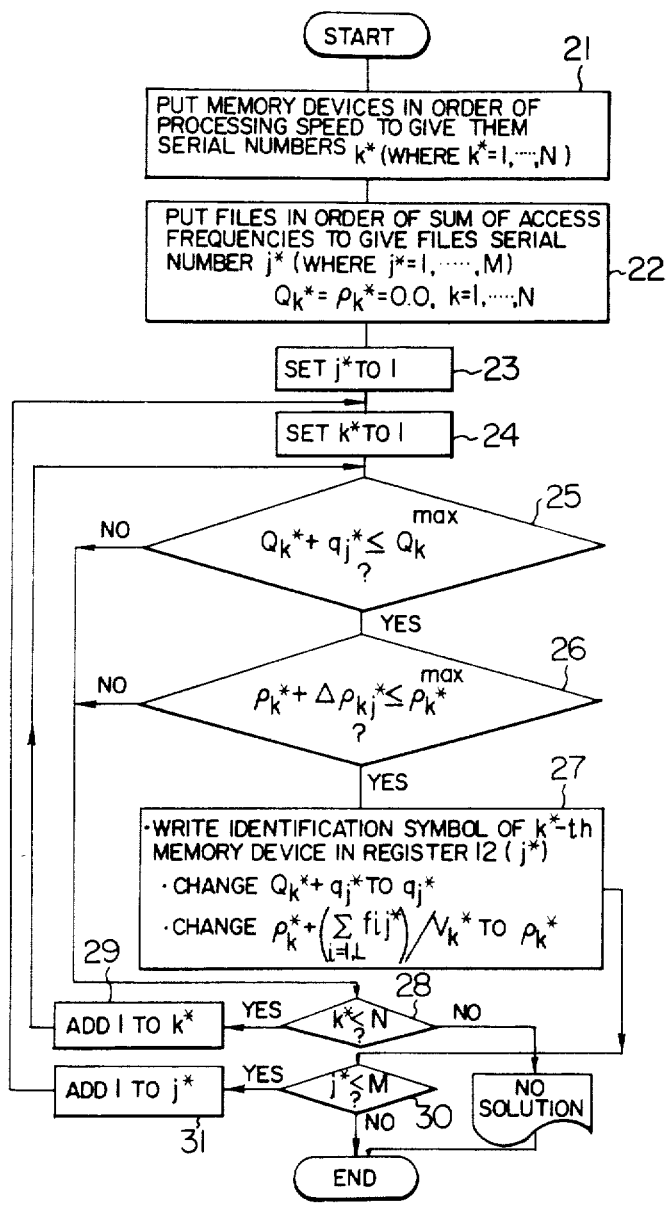
FIG. 2 is a flow chart showing the processing for determining file allocation which can minimize a total time taken to utilize memory devices, under such restrictions as the storage capacity and allowable utilization of each memory device.

An operator supplies the algorithm combination/direction device 6 with respective identification symbols of file allocation computing devices which are selected from the devices 5(1) to 5(H) and are to be used. In the case where the file allocation computing device 5(2) is used, the operator further supplies the device 6 with the desired availability for the service request of the i-th type (where $i=1, \ldots, L$). Further, in the case where only the file allocation computing device 5(2) is used, the identification symbol of a memory device, to which the j-th file (where $j=1, \ldots, M$) is allocated, is inputted to the device 6. The above-mentioned information inputted to the device 6 is transferred to the algorithm combining device 7. The device 7 carries out the following processing in accordance with the identification symbols transferred from the device 6. In the case where only the file allocation computing device 5(1) is specified among the devices 5(1) to 5(H), the device 7 retrieves (namely, reads out) information on the register 2(i, j) of the storage 2 (where $i=1, \ldots, L$, and $j=1, \ldots, M$), information on the register 10(i, 1) of the storage 10 (where $i=1, \ldots, M$), and information on the registers 4(k, 1), 4(k, 2) and 4(k, 3) of the storage 4 (where $k=1, \ldots, N$). The information thus obtained is transferred to the device 5(1). Then, the device 5(1) performs processing such as shown in FIG. 2. The fundamental thought of this processing is to minimize a total time taken to utilize the memory devices under such restrictions as the storage capacity and allowable utilization of each memory device, by allocating each file to the memory devices in such a manner that the processing speed of a memory devices, to which a file is allocated, is high as the access frequency of the file is higher. Referring to FIG. 2, in step 21, the device 5(1) first puts the memory devices in order of processing speed $V_k$ which is stored in the register 4(k, 1) (where $k=1, \ldots, N$), to give the memory devices serial numbers $k^*$ (where $k^*=1, \ldots, N$). Next, the access frequency $f_{ij}$ of the j-th file based upon the service request of the i-th type is read out of the register 2(i, j) (where $i=1, \ldots, L$, and $j=1, \ldots, M$) to calculate the sum of access frequencies of the j-th file (namely, $$\sum_{i=1,L} f_{ij}).$$

The files are put in order of the sum of access frequencies (step 22), to be given serial numbers $j^*$ (where $j^*=1, \ldots, M$). Then, the device 5(1) performs the following processing in order of $j^*=1, 2, \ldots$ and so on, and in order of $k^*=1, 2, \ldots$ and so on. At the beginning of the processing, the files are not yet allocated to the memory devices. Now, let us consider the state that ($j^*-1$) files have been allocated to $k^*$ memory devices. It is judged whether the sum of the total storage capacity $Q_{k^*}$ of files having been allocated to the $k^*$-th memory device and the storage capacity $q_{j^*}$ of the $j^*$-th file is greater than the storage capacity $Q_k^{max}$ of the $k^*$-th memory device or not (step 25). When the above-mentioned sum is greater than the storage capacity $Q_k^{max}$, the $j^*$-th file is allocated to a memory-device whose serial number is greater than $k^*$. However, when $k^* \geq N$, the storage capacity of the memory devices is insufficient. Accordingly, an identification signal indicating that effect is sent to the algorithm combining device 7, and the operation of the device 5(1) is completed. When the above-mentioned sum is smaller than or equal to the storage capacity $Q_k^{max}$, it is judged whether the sum of the availability $\rho_{k^*}$ of the $k^*$-th memory device by files having been allocated to the $k^*$-th memory device and the avialability $\Delta \rho_{k^*j}$ of the $k^*$-th memory device by the $j^*$-th file is greater than the allowable utilization $\rho_{k^*}^{max}$ of the $k^*$-th memory device or not (step 26). When the sum is greater than the allowable utilization $\rho_{k^*}^{max}$, the device 5(1) performs the same operation as in the case where the previously-mentioned sum $Q_{k^*} + q_{j^*}$ is greater than the storage capacity $Q_k^{max}$ (step 28). When the sum $\rho_{k^*} + \Delta \rho_{k^*j}$ is smaller than or equal to the allowable utilization $\rho_{k^*}^{max}$, the $j^*$-th file is allocated to the $k^*$-th memory device. Accordingly, the identification symbol of the $k^*$-th memory device is written in that register 12($j^*$) of the file reallocation pattern storage 12 which corresponds to the $j^*$-th file. In addition thereto, the total storage capacity $Q_{k^*}$ and availability $\rho_{k^*}$ are updated to include corresponding quantities of the $j^*$-th file. That is, the storage capacity $q_{j^*}$ is added to the total storage capacity $Q_{k^*}$, and the availability $$\Delta \rho_{k^*j} = \left( \sum_{i=1,L} f_{ij^*} \right) / V_{k^*}$$

is added to the availability $\rho_{k^*}$ (step 27). However, in the case where a time taken to use a memory device in a reference operation is different from a time taken to use the memory device in an update operation, the availability $\Delta \rho_{k^*j}$ is given by the following equation:

$$\Delta \rho_{k^*j} = \left[ \sum_{i=1,L} f_{ij^*}(U) \right] / V_{k^*}(U) + \left[ \sum_{i=1,L} f_{ij^*}(R) \right] / V_{k^*}(R)$$

where (U) indicates the update operation, and (R) the reference operation. The above-mentioned processing is carried out in order of $j^* = 1, 2, \ldots$ and so on. When it is judged that such processing has been executed for all of the files (step 30), the operation of the device 5(1) is completed. In the above-mentioned processing made by the device 5(1), the storage capacity $Q_k^{max}$ of the k*-th memory device is read out of the register 4(k*, 3), the storage capacity $q_{j^*}$ of the j*-th file is read out of the register 10(j*, 1), the access frequency $f_{ij^*}$ of the j*-th file corresponding to the service request of the i-th type is read out of the register 2(i, j*), and the processing speed $V_{k^*}$ of the k*-th memory device is read out of the register 4(k*, 1).

In the above description, explanation has been made on the case where only the file allocation computing device 5(1) is specified. Next, explanation will be made of the operation of the file allocation computing device 5(2) in the case where only the device 5(2) is specified. The algorithm combining device 7 first receives from the algorithm combination/direction device 6 the identification symbol of a memory device to which the j-th file is allocated (where $j = 1, \ldots, M$), and stores the identification symbols thus obtained in corresponding registers 12(j) (where $j = 1, \ldots, M$). Next, the device 7 retrieves (namely, reads out) information on the register 2(i, j) of the storage 2 (where $i = 1, \ldots, L$, and $j = 1, \ldots, M$) and information on the register 4(k, 5) of the storage 4 (where $k = 1, \ldots, N$). The information thus obtained is transferred to the file allocation computing device 5(2). Then, the device 5(2) carries out the processing shown in FIG. 3. Based upon the fact that when memory devices used by a service request of a type are simultaneously normal, the service request of the type is available, the fundamental thought of the above processing is to judge by calculation whether the probability that memory devices used by a service request are simultaneously normal, is smaller than a desired level or not. The device 5(2) performs the following processing, which starts at the service request of the first type (namely, $i = 1$). The information $f_{ij}$ is read out of the register 2(i, j) (where $j = 1, \ldots, M$), and files satisfying a relation $f_{ij} > 0$ are extracted to form a file group $F^i$ used by the service request of the i-th type (step 33). Next, in step 34, the identification symbol of a memory device, to which each file $F_j^i$ of the file group $F^i$ is allocated, is read out of a corresponding one of the registers 12(k) ($k = 1, \ldots, N$). As a result, there is obtained a list $S^i = (S_1^i, \ldots, S_{n_i}^i)$ of memory devices accessed by the service request of the i-th type. The list is written in the registers 13 (i, k) (where $k = 1, \ldots, n_i$). The list $S^i$ is formed so as to include a memory device only once. Then, the failure rate $p_k^i$ of each memory device $S_k^i$ included in the list $S^i$ is read out of a corresponding one of the registers 4(k, 5) (where $k = 1, \ldots, N$), to judge by calculation what the following formula (1) is satisfied or not (steps 35 and 36):

$$\pi_{S_k^i \epsilon S^i} (1 - p_k^i) > R_{i^*} \qquad (1)$$

The left-hand side of the formula (1) indicates the availability of memory devices for the service request of the i-th type, and the right-hand side the desired availability which is specified by the device 6 for the service request of the i-th type. When the formula (1) is not satisfied, identification information indicating that the file allocation pattern does not obtain the desired avaiability, is transferred from the device 5(2) to the device 7 (step 40), and thus the operation of the device 5(2) is completed. In the case where the formula (1) is satisfied, when $i < L$, the above-mentioned processing is performed for the service request of the (i+1) the type (steps 37 and 38). When $i \geq L$, it is judged that desired availability is obtained for the service requests of all types. Thus, identification information indicating that effect is transferred from the device 5(2) to the device 7 (step 39), and the operation of the device 5(2) is completed.

Figure 3:
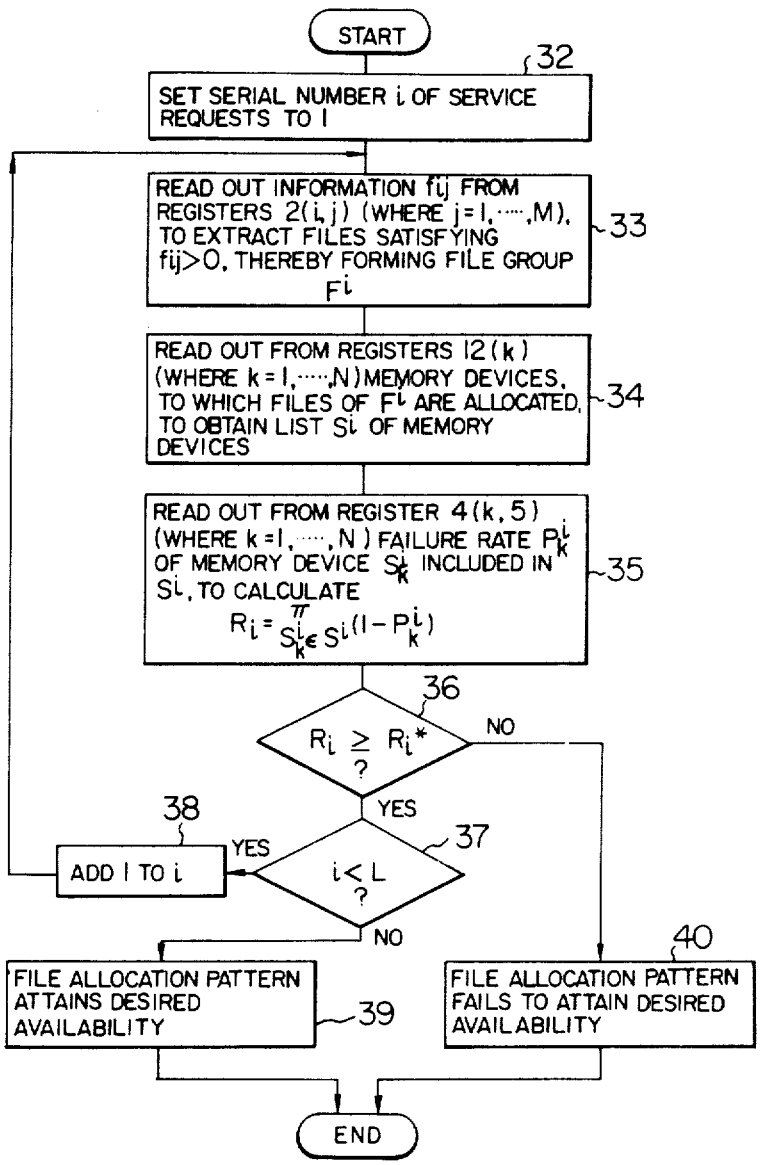
FIG. 3 is a flow chart showing the processing for judging whether desired avaiability for each type of service request can be obtained or not.
Figure 4:
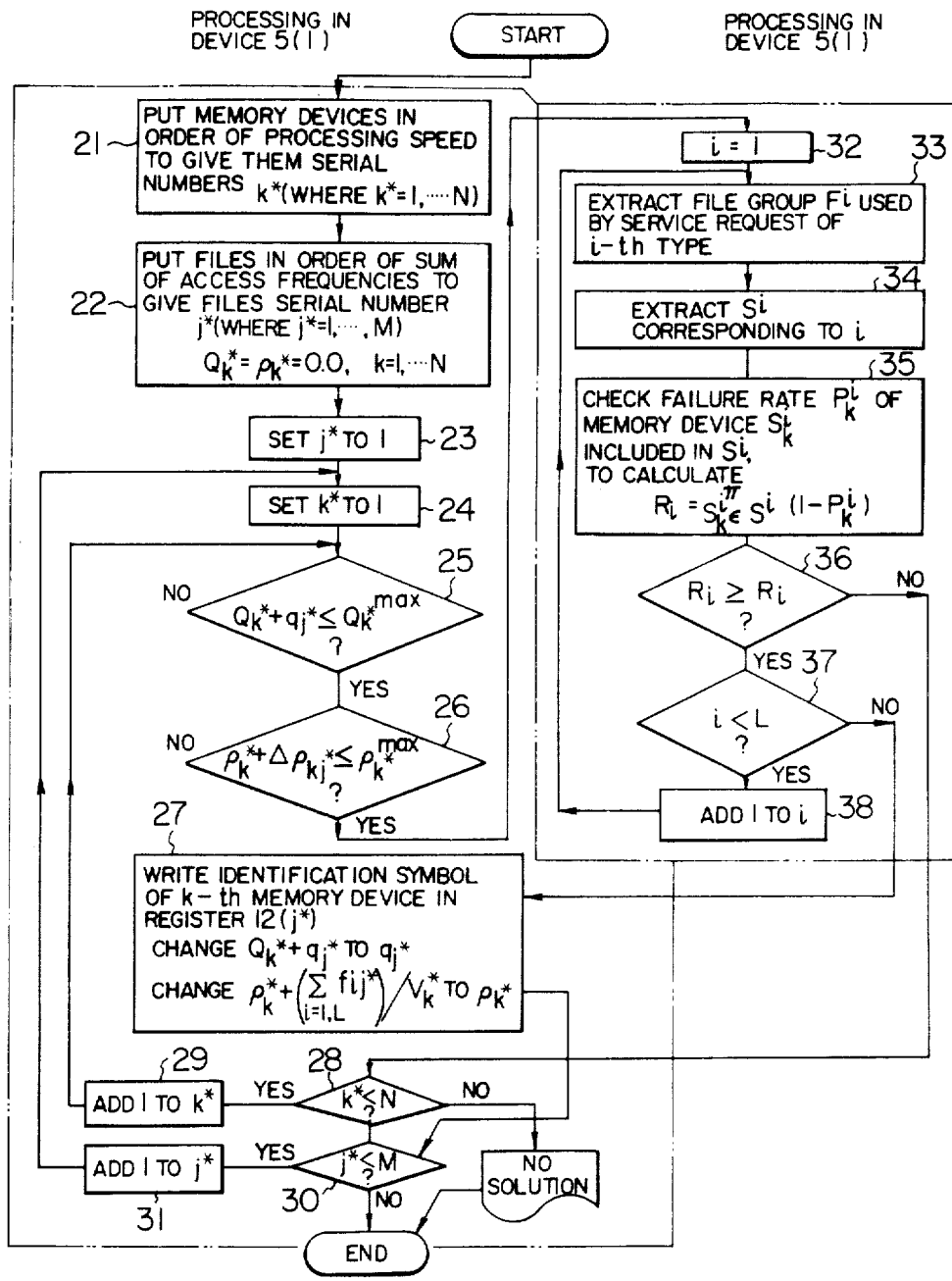
FIG. 4 is a flow chart showing the processing for determining file allocation which can minimize a total time taken to utilize memory devices, under such restrictions as the storage capacity and allowable utilization of each memory device and the desired availability for each type of service device.

In the foregoing description, explanation has been made on the processing in the case where one of the file allocation computing devices 5(1) and 5(2) is specified. Now, the processing in the case where both of the devices 5(1) and 5(2) are specified, will be explained below. The algorithm combining device 7 first retrieves (or reads out) information on the register 2(i, j) of the storage 2 (where $i = 1, \ldots, L$ and $j = 1, \ldots, M$), information on the registers 4(k, 1), 4(k, 2), 4(k, 3) and 4(k, 5) of the storage 4 (where $k = 1, \ldots, N$), and information on the register 10(i, 1) of the storage 10 (where $i = 1, \ldots, M$). Then, the device 7 combines the devices 5(1) and 5(2) to carry out the processing shown in FIG. 4. The fundamental thought of this processing is to combine a calculation process for obtaining an optimum file allocation pattern from the viewpoint of performance, with a calculation process for judging whether the desired availability is obtained or not. In more detail, the processing indicated by the flow chart of FIG. 3 is inserted between the steps 26 and 27 shown in FIG. 2. Though the processing shown in FIG. 3 is executed in the state that a file allocation pattern has been given, the processing shown in FIG. 2 begins in the state the any file is not yet allocated to the memory devices. Accordingly, when it is judged in the course of the processing shown in FIG. 4 whether the desired availability is obtained or not, only the failure rates of memory devices, to which files have been or are now being allocated, are considered. That is, the failure rates of other memory devices are assumed to be 0.0 in calculating the previously-mentioned probability. The device 7 combines the device 5(1) with the device 5(2) as follows. That is, the device 7 first causes the device 5(1) to execute the steps 21 to 26 shown in FIG. 2. When it is judged in step 26 that the sum of the availability $\rho_{k^*}$ and availability $\Delta \rho_{k^*i}$ is smaller than or equal to the allowable utilization $\rho_{k^*}^{max}$, the device 7 causes the device 5(2) to operate. Though the operation of the device 5(2) is similar to that shown in FIG. 3, the file allocation is partially determined. Accordingly, in the steps 34 and 35 carried out by the device 5(2), it is checked how the memory device group $S^i$ used by the service request of the i-th type and the availability R of memory devices for the above service request are changed by allocating the j*-th file to the k*-th memory device. In order to carry out the above-mentioned processing, it is checked whether the contents $f_{ij^*}$ of the register 2(i, j*) are positive or not. When $f_{ij^*}>0$, a memory device group $S^i$ used by the service request of the i-th type is read out of the register 13 (i, k) (where $k=1, \ldots, n_i$), and the k*-th memory device is added to the group $S^i$ to form a list of memory devices. The availability $R_i'$ of memory devices is calculated on the basis of this list, and then compared with the desired availability $R_{i^*}$. The device 5(2) sends to the device 7 identification information indicating that the availability condition is satisfied or unsatisfied, according as the relation $R_i' \geq R_{i^*}$ is satisfied for the service requests of all types or not. When the availability condition is sati satisfied, the device 7 adds the identification symbol of the k*-th memory device to the register 13(i, k) (where $k=1, \ldots, n_i$), writes the above symbol in the register 12(j*), and then causes the device 5(1) to execute the step 27 and the following steps shown in FIG. 2. When the availability condition is not satisfied, the device 7 causes the device 5(1) to execute the step 28 and the following steps.

In the above-mentioned, the operations of the file allocation computing devices 5(1) and 5(2) and algorithm combining device 7 have been explained. As a result of the above operations, the identification symbol of a memory device, to which the j-th file is allocated, is recorded in the register 12(j) of the storage.12 (where $j=1, \ldots, M$). Then, the device 7 displays on the displaying device 8 the contents of the registers 12(1) to 12(M) and other results of calculation. The contents displayed on the device 8 are observed by the operator or user, and modifying information is inputted to the modifying device 9 when it is necessary to modify the displayed contents. When it is judged the displayed contents are to be left unmodified, identification information indicating that effect is inputted to the device 9. Such information is transferred to the algorithm combining device 7. When modification is indicated, the device 7 rewrites a corresponding portion of the registers 12(1) to 12(M) on the basis of the transferred information. Next, the file reallocation device 11 compares the contents of the registers 12(j) with the contents of the registers 10(j, 2) of the storage 10 (where $j=1, \ldots, M$), to change the allocation of files to memory devices so that a file allocation pattern given by the latter registers agrees with that given by the former registers.

The present embodiment showing a computer system may be started by the memory usage storage 3. That is, the availability of the k-th memory device at the specified period $\Delta \tau$ is read out of the register 3(k) (where $k=1, \ldots, N$), to be compared with the allowable utilization of the above memory device stored in the register 4(k, 2) (where $k=1, \ldots, N$). In the case where the availability of one of the memory devices exceeds the corresponding allowable utilization, the embodiment is started.

In the present embodiment, the reallocation of files is carried out on the basis of actual values stored in the storage 2. Alternatively, the file reallocation may be made on the basis of a predicted value with respect to the frequency of use of each life. In this case, a predicted value with respect to the frequency of use of each life. In this case, a predicted value with respect to the access frequency $f_{ij}$ to a memory device for causing the service request of the i-th type to utilize the j-th file (where $i=1, \ldots, L$, and $j=1, \ldots, M$) is inputted to the device 6, and is transferred to the device 7 in place of the contents of the register 2(i, j) (where $i=1, \ldots, L$, and $j=1, \ldots, M$).

In the present embodiment, a file of high access frequency is preferentially allocated to a memory device of high processing speed by the file allocation computing device 5(1). Alternatively, a file allocating method may be used which takes into consideration the priority with respect to the response time (which is called "turn-around time" in batch processing) for each type of service request. In this case, a file used by service requests having high priority in response time is allocated to a memory device having a high processing speed. Accordingly, registers 2(1, 0) to 2(L, 0) are added to the file usage storage 2 shown in FIG. 1, and an identification number S (where $S=1, 2, \ldots$) indicating a priority class of the response time for the service request of the i-th type is stored in the register 2(i, o). The priority is devided into classes such as online, time-sharing and batch. Next, the step 22 in the processing carried out by the device 5(1) is modified as follows. First, service requests belonging to the first priority class (namely, $S=1$) are read out of the registers 2(1, 0) to 2(L, 0), and are given numbers $i^{(S=1)}$ (where $i^{(S=1)}=1, \ldots, L^{(S=1)}$). Then, the access frequency $f_i(S=1)_j$ of the j-th file due to the $i^{(S=1)}$-th service request is read out of the register $2(i^{(S=1)}, j)$ (where $i^{(S=1)}=1, \ldots, L^{(S=1)}$, and $J=1, \ldots, M$). Then, the total access frequency $$\sum_{i^{(S=1)}=1,L^{(S=1)}} f_i^{(S=1)}{}_j$$

of the j-th file due to all of the service requests belonging to the first priority class is calculated. Then, files used by such service requests are put in order of the total access frequency, to be given serial numbers j* (where $j^*=1, \ldots, M^{(S=1)}$). The symbol $M^{(S=1)}$ indicates the number of files used by the service requests belonging to the first priority class. Next, service requests belonging to the second priority class (namely, $S=2$) are read out, and given numbers $i^{(S=2)}$ (where $i^{(S=2)}=1, \ldots, L^{(S=2)}$). Then, an access frequency $f_i(S=2)_j$ is read out of the register $2(i^{(S=2)}, j)$ (where $i^{(S=2)}=1, \ldots, L^{(S=2)}$, and $j=1, \ldots, M$ excepting $j^*=1, \ldots, M^{(S=1)}$), to calculate the total access frequency $$\sum_{i^{(S=2)}=1,L^{(S=2)}} f_i^{(S=2)}{}_j.$$

Then, files used by the service requests belonging to the second priority class are put in order of this total access frequency, to be given the serial numbers j* (where $j^*=M^{(S=1)}+1, \ldots, M^{(S=2)}$). The symbol $M^{(S=2)}$ indicates the total number of files belonging to the first and second priority classes. Similar operations are performed for service requests belonging to each of priority classes such as the third and fourth classes. Based upon such operations, the files are given the serial numbers j* (where $j^*=1, \ldots, M$). Referring now to FIG. 2, the serial number j* thus given is set to 1 in step 23, and the serial number k* of memory devices is set to 1 in step 24.

In the above-mentioned embodiment and alternative examples, the storages 2, 3 and 10 can be formed of an ordinary register having a memory function, the device 11 is formed of, for example, HITAC VOS 21 and VOS 3 manufactured by Hitachi Ltd., to have a file allocating function, the devices 6 and 9 can be formed of an input device such as a keyboard and a card reader, and the device 8 can be formed of an output device such as a display device and a line printer.

As has been explained in the above-mentioned, according to the present embodiment, files or programs are assigned to a plurality of memory devices included in a computer system, so as to attain one or both of two objects, one of which is to minimize a total time taken to utilize the memory devices, under restrictions such as the storage capacity and allowable utilization of each memory device, and the other is to obtain desired avaiability for various service requests. Accordingly, the utilization efficiency of memory device is improved as a whole, the number of required memory devices is reduced, and a desired availability level for each type of service request can be attained.

In the embodiment shown in FIG. 1, it is impossible to assign files to memory devices while taking into consideration the degree of damage due to a fault which occurs in part of the memory devices.

Figure 5:
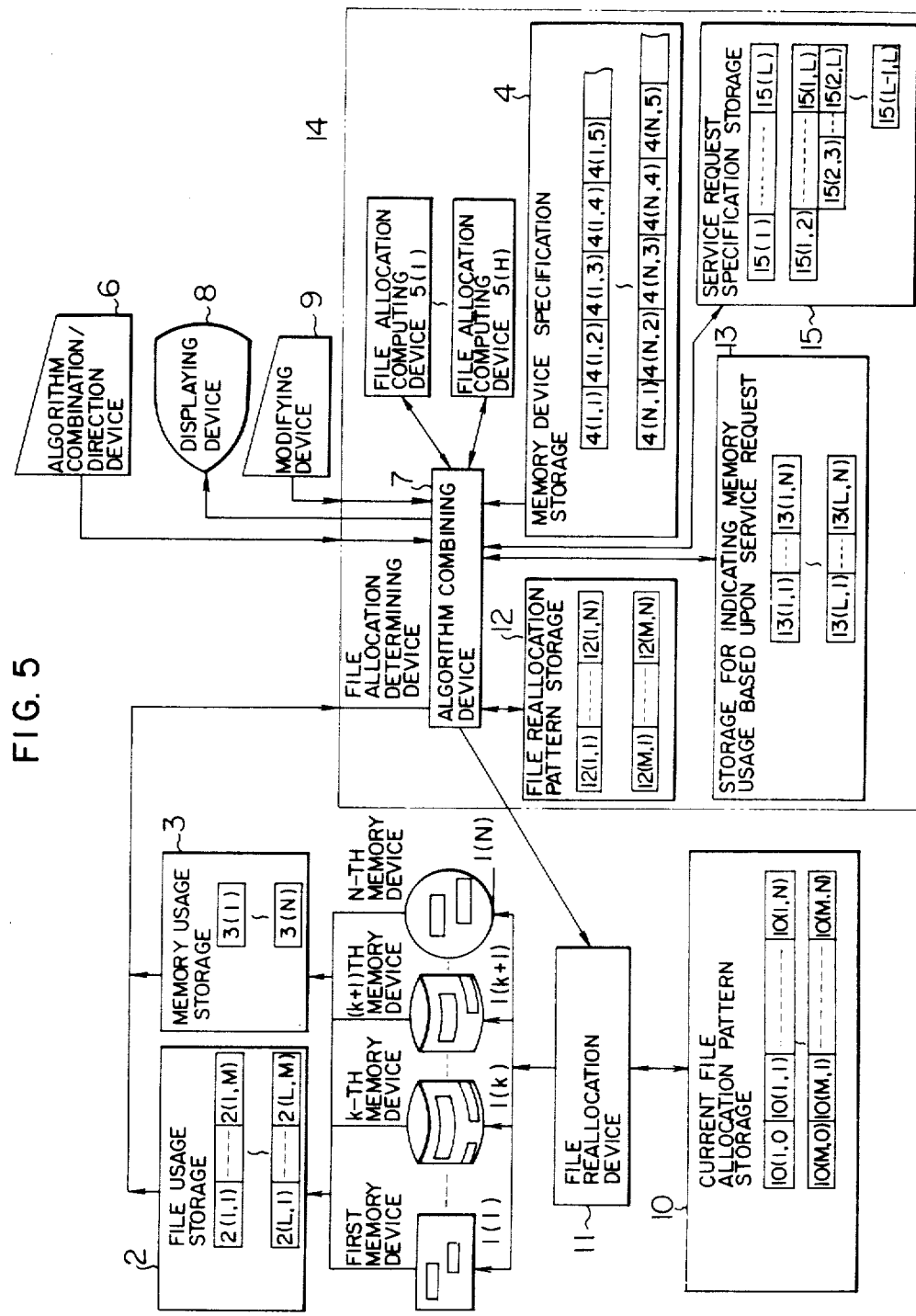
FIG. 5 is a block diagram showing the structure of another embodiment of a system which is used for realizing a file assigning method according to the present invention.

FIG. 5 shows, in block, another embodiment of a system for realizing a file assigning method according to the present invention, in which the degree of damage due to a fault in part of memory devices is made less than an allowable level, and the number of working processes for determining file allocation is reduced.

In FIG. 5, reference symbols 5(1) to 5(H) designate file allocation computing devices. For example, the device 5(1) determines by calculation an optimum file allocation pattern from the viewpoint of performance, the device 5(2) judges by calculation whether a file allocation pattern can attain a desired availability level which is previously specified, or not, and the device 5(3) judges by calculation whether a file allocation pattern causes damage exceeding a predetermined allowable level or not. Reference numeral 10 designates a current file allocation patter storage. In the storage 10, reference symbol 10 (j, 0) (where $j=1, \ldots, M$) designates a register for storing therein the storage capacity of the j-th file, and 10 (j, k) (where $j=1, \ldots, M$, and $k=1, \ldots, N$) a register for storing therein "1" or "0" according as the j-th file is allocated to the presently k-th memory device or not, that is, a register for showing a current file allocation pattern. Reference numeral 12 designates a file reallocation pattern storage, and reference symbol 12 (j, k) (where $j=1, \ldots, M$, and $k=1, \ldots, N$) indicates a register for storing therein "1" or "0" according as the j-th file is reallocated to the k-th memory device or not. Reference numeral 15 designates a service request specification storage. In the storage 15, reference symbol 15 (i) (where $i=1, \ldots, L$) designates a register for storing therein the value of damage based upon that the service request of the i-th type is made unexecutable, and 15(i, i') (where $i=1, \ldots, L, i'=1, \ldots, L$, and $i'>i$) a register for indicating that the service requests of the i-th and i'-th types are inhibited from simultaneously being unexecutable. In FIGS. 1 and 5, other like reference numerals and symbols designate like devices and elements.

Next, explanation will be made on the operation of the present embodiment having the above-mentioned structure.

An operator supplies to the algorithm combination/direction device 6 respective identification symbols of file allocation computing devices which are selected from the devices 5(1) to 5(H) and are to be used. In the case where the device 5(3) is used, the operator further supplies to the device 6 the value of damage $w_i$ for the service request of the i-th type $i=1, \ldots, L$), an allowable value W* for the sum total of the value of damage due to a fault in one memory device, and the service request of the i'-th type which is inhibited from becoming unexecutable at the same time as the service request of the i-th type. Incidentally, the value of damage $w_i$ (where $i=1, \ldots, L$) is determined on the basis of the importance of service, and the allowable value W* is determined from a judgment on service. Further, in the case where only the device 5(3) is used, a file allocation pattern, that is, the identification symbol of a memory device, to which the j-th file (where $j=1, \ldots, M$) is allocated, is inputted to the device 6. This identication symbol is transferred to the algorithm combining device 7, and then written in the registers 12(j, k) (where $j=1, \ldots, M$). Further, the device 7 writes the value of damage $w_i$ for the service device of the i-th type (where $i=1, \ldots, L$) in the register 15(i), and writes a value "1" in the register 15(i, i') to show that the service request of the i'-type is inhibited from becoming unexecutable at the same time as the service request of the i-th. Next, the device 7 retrieves (namely, reads out) information on the register 2(i, j) of the storage 2 (where $i=1, \ldots, L$, and $j=1, \ldots, M$), and the information thus obtained is transferred to the device 5(3). Then, the device 5(3) carries out the processing shown in FIG. 6. The fundamental thought of this processing is based upon the following facts. (i) The service request of any type, for example, the i-th type can be executed only when all files required by the service request of the i-th type are usable. (ii) In the case where the copy of the j-th file (where $j=1, \ldots, M$) is placed only in the k-th memory device (where $k=1, \ldots, N$), the j-th file becomes unusable when the k-th memory device is damaged. However, in the case where the copy of the j-th file is placed in a plurality of memory devices, the j-th file can be used even when the k-th memory device is damaged. (iii) Thus, it is possible to determine the service request which becomes unexecutable when the k-th memory device is damaged. Based upon these facts, the above-mentioned fundamental thought is to judge whether the sum total of the value of damage for each unexecutable service request is less than an allowable value or not, and to check whether a specified pair of service requests can be made simultaneously unexecutable or not.

The device 5(3) carries out the processing shown in FIG. 6. At first, the sum total W of the value of damage is set to zero (step 51). Then, the serial number k of the memory devices is set to 1 and the serial number i indicating the types of service request is also set to 1 (steps 52 and 53). Next, the information $f_{ij}$ is read out of the register 2(i, j) (where $j=1, \ldots, M$), and files satisfying a relation $f_{ij} > 0$ are extracted to form a file group $F^i$ used by the service request of the i-th type (step 54). In step 55, a memory device, to which a file $F_j^i$ included in the file group $F^i$ is allocated, is checked in corresponding ones of the registers 12(j, k*) (where $k^*=1, \ldots, N$). In the case of 12($F_j^i$, k)=1, and 12 ($F_j^i$, k*)=0 for $k^*=k$, it is known that the file $F_j^i$ is arranged only in the k-th memory device. In this case, the value of damage $w_i$ is read out of the register 15(i), and then added to the sum total W. When $i < L$, "1" is added to i (steps 55 and 56), and the precessing is returned to step 54. When $i \geq L$, it is judged whether a relation $W \leq W^*$ is satisfied or not (step 57). When W>W*, it is indicated that the sum total W of the value of damage due to a fault in the k-th memory device exceeds the allowable value W*, and identification information indicating that a condition with respect to the degree of damage is not satisfied, is sent from the device 5(3) to the device 7 to complete the processing. When W≦W*, it is judged whether k is less than N or not (step 58). When k<N, "1" is added to k (step 59), and the processing is returned to steps 53 and 54. When k≧N, the following processing is performed. At first, the serial number i indicating the types of service request is set to 1 (step 60). Then, the information $f_{ij}$ is read out of the register 2(i, j) (where j=1, ..., M), and files satisfying the relation $f_{ij}>0$ are extracted to form a file group $F^i$ used by the service request of the i-th type (step 61). A memory device, to which a file $F_j^i$ included in the file group $F^i$ is to be allocated, is checked in corresponding ones of the registers 12(j, k*) (where k*=1, ... N). In the case of 12($F_j^i$, k)=1, and 12 ($F_j^i$, k*)=0 for k*=k, it is known that the file $F_j^i$ is arranged only in the k-th memory device. Such a memory device is collected for all of the files included in the file group $F^i$ to form the set $S^i$ of memory devices (step 62). In step 63, i' is set to (i+1). Then, the value on the register 15(i, i') is checked (step 64). When the value is "0", the processing is advanced to step 68. When the value is "1", it is indicated that the service requests of the i-th and i'-th types are inhibited from simultaneously being unexecutable. Accordingly, the information $f_{i'j}$ is read out of the register 2(j', j) (where j=1, ..., M), and files satisfying a relation $f_{i'j}>0$ are extracted to form a file group $F^{i'}$ used by the service request of the i'-th type (step 65). A memory device, to which a file $F_j^{i'}$ included in the file group $F^{i'}$ is to be allocated, is checked in the registers 12($F_j^{i'}$, k*) (where k*=1, ..., N). The memory device satisfying conditions 12($F_j^{i'}$, k)=1 and 12($F_j^{i'}$, k*)=0 for k*=k is collected for all of the files included in the file group $F^{i'}$ to form the set S' of memory devices (step 66). It is checked whether the sets $S^i$ and $S^{i'}$ include at least one memory device in common or not (step 67). When the sets include a memory device in common, the condition that the service requests of the i-th and i'-th types are inhibited from simultaneously being unexecutable, cannot be satisfied, and therefore identification information indicating that this condition is not satisfied, is sent from the device 5(3) to the device 7 to complete the processing. When the two sets include no memory device in common, it is checked whether i' is less than L or not (step 68). When i'<L, "1" is added to i' (step 69), and the processing is returned to step 64. When i'≧L, it is checked whether i is less than L or not (step 70). When i<L, "1" is added to i (step 71), and the processing to returned to step 61. When i>L, all of the conditions with respect to the degree of damage are satisfied, and therefore identification information indicating that effect is sent from the device 5(3) to the device 7, to complete the processing.

In the above-mentioned, explanation has been made on the processing in the case where only the file allocation computing device 5(3) is specified. Now, the processing in the case where both of the devices 5(1) and 5(3) are specified, will be explained below. The algorithm combining device 7 first checks information on the register 2(i, j) of the storage 2 (where i=1, ..., L, and j=1, ..., M), information on the registers 4(k, 1), 4(k, 2), 4(k, 3) and 4(k, 5) of the storage 4 (where k=1, ..., N), and information on the registers 10 (j, 0) and 10 (j, k) of the storage 10 (where j=1, ..., M, and k=1, ..., N). Then, the device 7 combines the file allocation computing devices 5(1) and 5(3) to carry out the processing shown in FIG. 7. The fundamental thought of this processing is to incorporate a calculation process for checking the degree of damage into a calculation process for obtaining an optimum file allocation pattern from the viewpoint of performance. The device 7 combines the devices 5(1) and 5(3) so as to carry out the following processing. At first, the device 5(1) operates as follows. The processing speed $V_k$ of the k-th memory device is read out of the register 4(k, 1) (where k=1, . ., N), and the memory devices are put in order of the processing speed, to be given serial numbers k* (where k*=1, ..., N). Next, the access frequency $f_{ij}$ of the i-th file based on the service request of the i-th type is read out of the register 2(i, j) (where i=1, ..., L, and j=1, ..., M) and the storage capacity $q_j$ of the i-th file is read out of the register 10 (j, 0) (where j=1, ..., M), to calculate a ratio of the sum total of the access frequency $f_{ij}$ to the storage capacity $q_i$, namely, $$\left( \sum_{i=1,L} f_{ij} \right) / q_i.$$

The files are put in order of this ratio, to be given serial numbers j* (where j*=1, ..., M). Then, j* is set to "1", and k* is set to "1". At this time, no file is not allocated to the memory devices. Now, let us considered the state that (j*-1) files have been allocated to k* memory devices. It is judged whether the sum of the total storage capacity $Q_{k*}$ of files having been allocated to the k*-th memory device and the storage capacity $q_{j*}$ of the j*-th file exceeds the storage capacity $Q_k^{max}$ of the k*-th memory device or not (step 75 shown in FIG. 7). When the above-mentioned sum exceeds the storage capacity $Q_k^{max}$, the j*-th file is allocated to a memory device whose serial number is greater than k*. However, when k*≧N, it is known that the storage capacity of the memory devices is insufficient, and therefore an identification symbol indicating that effect is sent from the device 5(1) to the device 7 to complete the operation of the devices 5(1) and 5(3). In the case where the sum $Q_{k*}+q_{j*}$ is smaller than or equal to the storage capacity $Q_k^{max}$, it is judged whether the sum of the availability $\rho_{k*}$ of the k*-th memory device by files having been allocated thereto and the availability $\Delta\rho_{k*j}$ of the k*-th memory device by the j*-th file exceeds the allowable utilization $\rho_{k*}^{max}$ of the k*-th memory device or not (step 76). When the sum $\rho_{k*}+\Delta\rho_{k*j}$ exceeds the allowable value $\rho_{k*}^{max}$, the device 5(1) performs the same operation as in the case where the sum of the storage capacity $Q_{k*}$ and storage capacity $q_{j*}$ exceeds the storage capacity $Q_k^{max}$. When the sum of the availability $\rho_{k*}$ and availability $\Delta\rho_{k*j}$ is smaller than or equal to the allowable value, the device 7 causes the device 5(3) to operate. Though the operation of the device 5(3) is similar to that shown in FIG. 6, the file allocation is partially determined. Accordingly, the processing in the steps 54, 55, 61, 62, 65 and 66 of FIG. 6 is carried out only for files having been allocated to memory devices and the j*-th file which is now being allocated to a memory device. In the case where i≧L in the step 70 of FIG. 6, that is, all of the conditions with respect to the degree of damage are satisfied, the device 7 adds the identification symbol of the k*-th memory device to the registers 13(i, k) (where k=1, ..., $n_i$), writes "1" in the register 12 (j*, k*), and causes the device 5(1) to carry out step 77 and the following steps shown in FIG. 7. In the case where the conditions with respect to the degree of damage are not satisfied, the device 7 causes the device 5(1) to carry out step 78 and the following steps without carrying out the step 77. Since the processing in the steps 78 to 81 is the same as shown in FIG. 2, the explanation thereof is omitted.

In the above-mentioned, explanation has been made on respective oeprations of the file allocation computing devices 5(3) and 5(1) and algorithm combining device 7. As a result of these operations, "1" is written in the register 12(j, k) corresponding to a memory device, to which the j-th file is to be allocated (where j=1, ..., M, and k=1, ..., N). The contents of the registers 12(j, k) (where j=1, ..., M, and k=1, ..., N) and other results of calculation are sent to the displaying device 8, to be displayed thereon. The operator or user observes the contents displayed on the device 8, and supplies the modifying device 9 with modifying information, if necessary. When it is judged that the contents displayed on the device 8 are satisfactory, identification information indicating that effect is inputted to the modifying device 9. These inputs of the device 9 are transferred to the device 7. In the case where modification is necessary, the device 7 rewrites corresponding ones of the registers 12(j, k) (where j=1, ..., M, and k=1, ..., N) on the basis of the transferred information. Next, the file reallocation device 11 compares the contents of the registers 12(j, k) (where j=1, ..., M, and k=1, ..., N) with the contents of the registers 10(j, k) of the current file allocation pattern storage 10 (where j=1, ..., M, and k=1, ..., N), to change the allocation of files to memory devices so that the file allocation pattern shown by the registers 10(j, k) agrees with that shown by the registers 12(j, k). Thereafter, the device 11 rewrites the registers 10(j, k) so that the contents thereof agree with the contents of the registers (j, k).

As has been explained in the above-mentioned, according to the embodiment shown in FIG. 5, files or programs are assigned to a plurality of memory devices included in a computer system, so as to attain one or a combination of three objects, the first of which is to minimize a total time taken to utilize the memory devices, under restrictions such as the storage capacity and allowable utilization of each memory device, the second of which is to obtain desired availability of memory devices for each service request, and the third of which is to make the degree of damage caused by a fault in part of the memory devices less than a specified level. Accordingly, the utilization efficiency of memory device is improved as a whole, the number of required memory devices is reduced, a desired availability level for each service request is attained, and the degree of damage caused by a fault occurring in part of the memory devices can be suppressed.

What is claimed is:

1. A method of assigning software resources to memory devices comprising:
    a first step of storing the access frequency to a memory device for causing each type of service request to utilize each of software resources, and storing the processing speed, allowable utilization and storage capacity of each of memory devices;
    a second step of determining, on the basis of information stored in said first step, the allocation of each software resource to said memory devices while being restricted by said allowable utilization and storage capacity of each memory device, so that the processing speed of a memory device, to which a software resource is allocated, is high as the access frequency of said software resource is higher, to minimize a total time taken to access said memory devices; and
    a third step of carrying out the assignment of said software resources to said memory devices on the basis of the results obtained in said second step.

2. A method of assigning software resources to memory devices comprising:
    a first step of storing information indicating whether the access to a memory device for causing each type of service request to utilize each of software resources is present or absent, information with respect to the failure rate of each memory device, and information indicating how each of software resources is allocated to said memory device;
    a second step of judging on the basis of said information with respect to said failure rate whether a software resource allocation pattern stored in said second step can obtain desired availability of said memory devices or not, said desired availability being specified for each type of service request; and
    a third step of carrying out the assignment of said software resources to said memory devices on the basis of the results of judgment in said second step.

3. A method of assigning software resources to memory devices according to claim 1, wherein said method further comprises a fourth step of storing information with respect to the failure rate of each memory device, and said second step determines the allocation of each software resource to said memory devices on the basis of information stored in said first and fourth steps so that a total time taken to access said memory devices is minimized while being restricted by said allowable utilization and storage capacity of each memory device and obtaining desired availability of said memory devices specified for each type of service request.

4. A method of assigning software resources to memory devices according to claim 1, wherein said method further comprises a fourth step of storing information with respect to the priority in response time of each type of service request, and said second step determines, on the basis of informatoin stored in said first and fourth steps, the allocatoin of each software resource to said memory devices while being restricted by said allowable utilization and storage capacity of each memory device, so that the processing speed of a memory device, to which a software resource is allocated, is high as the priority in response time of a service request freuqntly utilizing said software resource is higher.

5. A method of assigning software resources to memory devices according to claim 4, wherein said method further comprises a fifth step of storing information with respect to the failure rate of each memory device, and said second step determines, on the basis of information stored in said first, fourth and fifth steps, the allocation of each software to said memory devices, while being restricted by said allowable utilization and storage capacity of each memory device and obtaining desired availability of said memory devices specified for each type of service request, so that the processing speed of a memory device, to which a software resource is allocated, is high as the priority in response time of a service request frequently utilizing said software resource is higher.

6. A method of assigning software resources to memory devices comprising:
- a first step of storing information indicating whether each of software resources is necessary to execute each type of service request or not, information indicating how each of said software resources is allocated to memory devices, and the value of damage for each type of service request at a time said service request becomes unexecutable;
- a second step of computing the sum total of said value of damage at a time a fault occurs in part of said memory devices, for a software resource allocation pattern stored in said first step, on the basis of information stored in said first step, to judge whether said sum total exceeds a specified allowable value or not; and
- a third step of carrying out the assignment of said software resources to said memory devices on the basis of the results of judgment in said second step.

7. A method of assigning software resources to memory devices comprising:
- a first step of storing information indicating whether each of software resources is necessary to execute each type of service request or not;
- a second step of storing information indicating how each of said software resources is allocated to memory devices;
- a third step of storing respective identication symbols of service requests of a type and another type which are inhibited from simultaneously being unexecutable;
- a fourth step of judging on the basis of information stored in said first step whether a software allocation pattern stored in said second step satisfies the inhibiting condition stored in said third step or not; and
- a fifth step of carrying out the assignment of said software resources to said memory devices on the basis of the results of judgment in said fourth step.

8. A method of assigning software resources to memory devices according to claim 1, wherein said method further comprises a fourth step of storing the value of damage for each type of service request at a time said service request becomes unexecutable, and respective identification symbols of servide requests of a type and another type which are inhibited from simultaneously being unexecutable, and wherein said second step determines the allocation of each software resource to said memory devices on the basis of information stored in said first and fourth steps so that a total time taken to access said memory devices is minimized while being restricted by said allowable utilization and storage capacity of each memory device, said value of damage, and the inhibiting condition in said fourth step.

9. An apparatus for assigning software resources to memcry devices comprising:
- first means for storing therein the access frequency to a memory device for casuing each type of service request to utilize each of software resources, and the processing speed, allowable utilization and storage capacity of each of memory devices;
- second means for determining, on the basis of information stored in said first means, the allocation of each software resource to said memory devices while being restricted by said allowable utilization and storage capacity of each memory device, so that the processing speed of a memory device, to which a software resource is allocated, is high as the access frequency of said software resource is higher, to minimize a total time taken to access said memory devices; and
- third means for carrying out the assignment of said software resources to said memory devices on the basis of the results determined by said second means.

10. An apparatus for assigning software resources to memory devices comprising:
- first means for storing therein information indicating whether the access to a memory device for causing each type of service request to utilize each of software resources is present or absent, information with respect to the failure rate of each of memory devices and information indicating how each software resource is allocated to said memory devices;
- second means for judging on the basis of information stored in said first means whether a software allocation pattern stored in said first means can obtain desired availability of said memory devices or not, said desired availability being specified for each type of service request; and
- third means for carrying out the assignment of said software resources to said memory devices on the basis of the results of judgment in said second means.

11. An apparatus for assigning software resources to memory devices according to claim 9, wherein said apparatus further comprises fourth means for storing therein information with respect to the priority in response time of each type of service request, and said second means determines, on the basis of information stored in said first and fourth means, the allocation of each software resource to memory devices while being restricted by said allowable utilization and storage capacity of each memory device, so that the processing speed of a memory device, to which a software resource is allocated, is high as the priority in response time of a service request frequently utilizing said software resource is higher.

12. An apparatus for assigning software resources to memory devices comprising:
- first means storing therein information indicating whether each of software resources is necessary to execute each type of service request or not, information indicating how each of said software resources is allocated to memory devices, and the value of damage for each type of service request at a time said service request becomes unexecutable;
- second means for computing the sum total of said value of damage at a time a fault occurs in part of said memory devices, for a software allocation pattern stored in said first means, on the basis of information stored in said first means, to judge whether said sum total exceeds a specified allowable value or not; and
- third means for carrying out the assignment of said software resources to said memory device on the basis of the results of judgment in said second means.

* * * * *